United States Patent
Li et al.

(10) Patent No.: US 7,088,474 B2
(45) Date of Patent: Aug. 8, 2006

(54) METHOD AND SYSTEM FOR ENHANCING IMAGES USING EDGE ORIENTATION

(75) Inventors: Guo Li, San Diego, CA (US); Clayton Brian Atkins, Mountain View, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 874 days.

(21) Appl. No.: 09/953,003

(22) Filed: Sep. 13, 2001

(65) Prior Publication Data

US 2003/0053161 A1     Mar. 20, 2003

(51) Int. Cl.
*H04N 1/40*     (2006.01)
(52) U.S. Cl. ..................... 358/3.27; 382/260
(58) Field of Classification Search ................. 358/1.9, 358/2.1, 3.27, 532; 382/260, 263, 266, 269, 382/199–200
See application file for complete search history.

(56) References Cited

U.S. PATENT DOCUMENTS

| | | | | |
|---|---|---|---|---|
| 5,103,306 A * | 4/1992 | Weiman et al. | .......... | 348/400.1 |
| 5,257,116 A | 10/1993 | Suzuki | ........................ | 358/465 |
| 5,335,298 A * | 8/1994 | Hevenor et al. | ............ | 382/199 |
| 5,633,948 A * | 5/1997 | Kegelmeyer, Jr. | .......... | 382/132 |
| 6,021,256 A | 2/2000 | Ng et al. | | |
| 6,208,763 B1 | 3/2001 | Avinash | | |
| 6,735,341 B1 * | 5/2004 | Horie et al. | ................ | 382/239 |

FOREIGN PATENT DOCUMENTS

| | | |
|---|---|---|
| JP | 10155128 | 6/1998 |
| JP | 2000115542 | 4/2000 |

* cited by examiner

*Primary Examiner*—Thomas D. Lee
*Assistant Examiner*—Stephen Brinich

(57) ABSTRACT

A method and system for enhancing images utilizes the direction of a detected edge within an image block of an input image to selectively smooth or sharpen a pixel of the input image that corresponds to that image block. The direction of a detected edge within the image block is determined by computing the horizontal gradient and the vertical gradient, and then using the ratio of the computed gradients. In an exemplary embodiment, the method and system is designed to exclusively use bit shifting to perform multiplications, rather than using digital signal processing. Consequently, the method and system is suitable for implementation in printer firmware and/or hardware.

18 Claims, 8 Drawing Sheets

FIG. 8

| -2 p0 | -1 p1 | 0 p2 | 1 p3 | 2 p4 |
|---|---|---|---|---|
| -2 p5 | -1 p6 | 0 p7 | 1 p8 | 2 p9 |
| -2 p10 | -1 p11 | 0 p12 | 1 p13 | 2 p14 |
| -2 p15 | -1 p16 | 0 p17 | 1 p18 | 2 p19 |
| -2 p20 | -1 p21 | 0 p22 | 1 p23 | 2 p24 |

FIG. 9

| 2 p0 | 2 p1 | 2 p2 | 2 p3 | 2 p4 |
|---|---|---|---|---|
| 1 p5 | 1 p6 | 1 p7 | 1 p8 | 1 p9 |
| 0 p10 | 0 p11 | 0 p12 | 0 p13 | 0 p14 |
| -1 p15 | -1 p16 | -1 p17 | -1 p18 | -1 p19 |
| -2 p20 | -2 p21 | -2 p22 | -2 p23 | -2 p24 |

METHOD AND SYSTEM FOR ENHANCING IMAGES USING EDGE ORIENTATION

FIELD OF THE INVENTION

The invention relates generally to image processing, and more particularly to a method and system for enhancing images by sharpening and/or smoothing.

BACKGROUND OF THE INVENTION

Sharpening and smoothing operations are commonly used to enhance the appearance of digital images. A sharpening operation is used to emphasize edges and features in a digital image. In contrast, a smoothing operation is used to suppress visual noise in smooth areas of a digital image. These image enhancements can be used to compensate for image degradation due to defects or irregularities in the imaging sensor, optical lens or other elements in the image capture device. Furthermore, these image enhancements can be used to improve the quality of printed images. Most inkjet printers use a halftoning process to render ink drops onto printing media to create printed images with apparent continuous tone level. The appearance of continuous tone level is achieved by modulating the ink drops in either frequency or size, according to the grayscales in the original images. However, ink drop placement error and ink drop shape variation may weaken high spatial frequency components in the original images. As a result, the printed version of original images may appear blurry.

One technique to compensate for this problem is to enhance edges (high frequency components) within an input image before the halftoning process by sharpening these edges, so that enough high frequency components remain after the halftoning process. However, if just simple conventional image sharpening process is applied to the entire input image, the noise included in the image may also get enhanced. Thus, intelligent image enhancing processes have been developed to selectively perform either a sharpening operation or a smoothing operation. These intelligent image enhancing processes first determine whether the current pixel of an input image is in a smooth area or near an edge of the image. If the current pixel is in a smooth area of the image, a smoothing operation is performed on that pixel. An example of a conventional smoothing operation involves averaging the current pixel with neighboring pixels. On the other hand, if the current pixel is near an edge of the image, a sharpening operation is performed on that pixel. An example of a conventional sharpening operation involves filtering the current pixel of an input image through a high-pass filter and then adding to the original pixel a signal proportional to the high-pass filtered version of that pixel. Thus, high-frequency components of the input image are emphasized. By determining whether a pixel of an input image is near an edge, these intelligent image enhancing processes can apply the proper operation to each pixel of an input image to enhance the image for the printing process.

A concern with the conventional intelligent image enhancing processes is that these processes tend to be computationally intensive. Thus, the conventional intelligent image sharpening processes are not well suited for ASIC hardware or printer firmware implementation.

In view of this concern, there is a need for a method and system for intelligently enhancing images in a less computationally intensive manner, and consequently, is suitable for ASIC hardware or printer firmware implementation.

SUMMARY OF THE INVENTION

A method and system for enhancing images utilizes the direction of a detected edge within an image block of an input image to selectively smooth or sharpen a pixel of the input image that corresponds to that image block. The direction of a detected edge within the image block is determined by computing the horizontal gradient and the vertical gradient, and then using the ratio of the computed gradients. In an exemplary embodiment, the method and system is designed to exclusively use bit shifting to perform multiplications, rather than using digital signal processing. Consequently, the method and system is suitable for implementation in printer firmware and/or hardware.

A method in accordance with the invention includes the steps of detecting an edge within an image block of an input digital image that corresponds to a pixel of the input image, determining a direction of the detected edge, and sharpening the pixel of the input image according to the determined edge direction.

In an embodiment, the step of determining the direction of the detected edge includes a sub-step of utilizing a ratio of the horizontal gradient value and the vertical gradient value of the image block to determine the edge direction. The sub-step of utilizing the ratio of the horizontal and gradient values may include computing the horizontal and vertical gradient values using bit shifting. Further, the sub-step may include comparing a multiple of the horizontal gradient value with a multiple of the vertical gradient value. The multiples of the horizontal and vertical gradient values may be computed using bit shifting.

In an embodiment, the step of detecting an edge within the image block includes comparing the difference between the maximum pixel value and the minimum pixel value of the image block with a predefined threshold.

In an embodiment, the step of sharpening the pixel of the input image includes applying sharpening to selected pixel values of the image block along the edge direction to produce an enhanced pixel of the pixel of the input image. Furthermore, the step of sharpening the pixel of the input image may include applying smoothing to selected pixel values of the image block along a perpendicular direction of the edge direction.

In an embodiment, the method further includes the step of smoothing the pixel of the input image when an edge is not detected in the image block. The step of smoothing the pixel of the input image further includes applying smoothing to selected pixel values of the image block along two preselected perpendicular directions to produce a smoothed pixel of the pixel of the input image.

A system in accordance with the invention includes an edge detector, an edge orientation computer and a sharpening unit. The edge detector is configured to detect an edge within an image block of an input image that corresponds to a pixel of the input image. The edge orientation computer is configured to determine a direction of the detected edge within the image block. The sharpening unit is configured to enhance the pixel of the input image according to the edge direction.

In an embodiment, the edge orientation computer is configured to utilize a ratio of a horizontal gradient value and a vertical gradient value of the image block to determine the edge direction. The edge orientation computer may be configured to compute the horizontal and vertical gradient values using bit shifting. Further, the edge orientation computer may be configured to compare a multiple of the horizontal gradient value with a multiple of the vertical gradient value to determine the edge direction. The multiples of the horizontal and vertical gradient values may be computed using bit shifting.

In an embodiment, the sharpening unit is configured to apply sharpening to selected pixel values of the image block along the edge direction to produce an enhanced pixel of the pixel of the input image. In addition, the sharpening unit may be configured to apply smoothing to selected pixel values of the image block along a perpendicular direction of the edge direction to produce the enhanced pixel.

In an embodiment, the system further includes a smoothing unit that is configured to smooth the pixel of the input image when an edge is not detected in the image block by the edge detector. The smoothing unit is further configured to apply smoothing to selected pixel values of the image block along two pre-selected perpendicular directions to produce a smoothed pixel of the pixel of the input image.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 8 is a diagram of a coefficient matrix, which is used to compute the horizontal gradient $G_x$ of a current image block of an input image.

FIG. 9 is a diagram of a coefficient matrix, which is used to compute the vertical gradient $G_y$ of a current image block of an input image.

DETAILED DESCRIPTION

Figure 1:
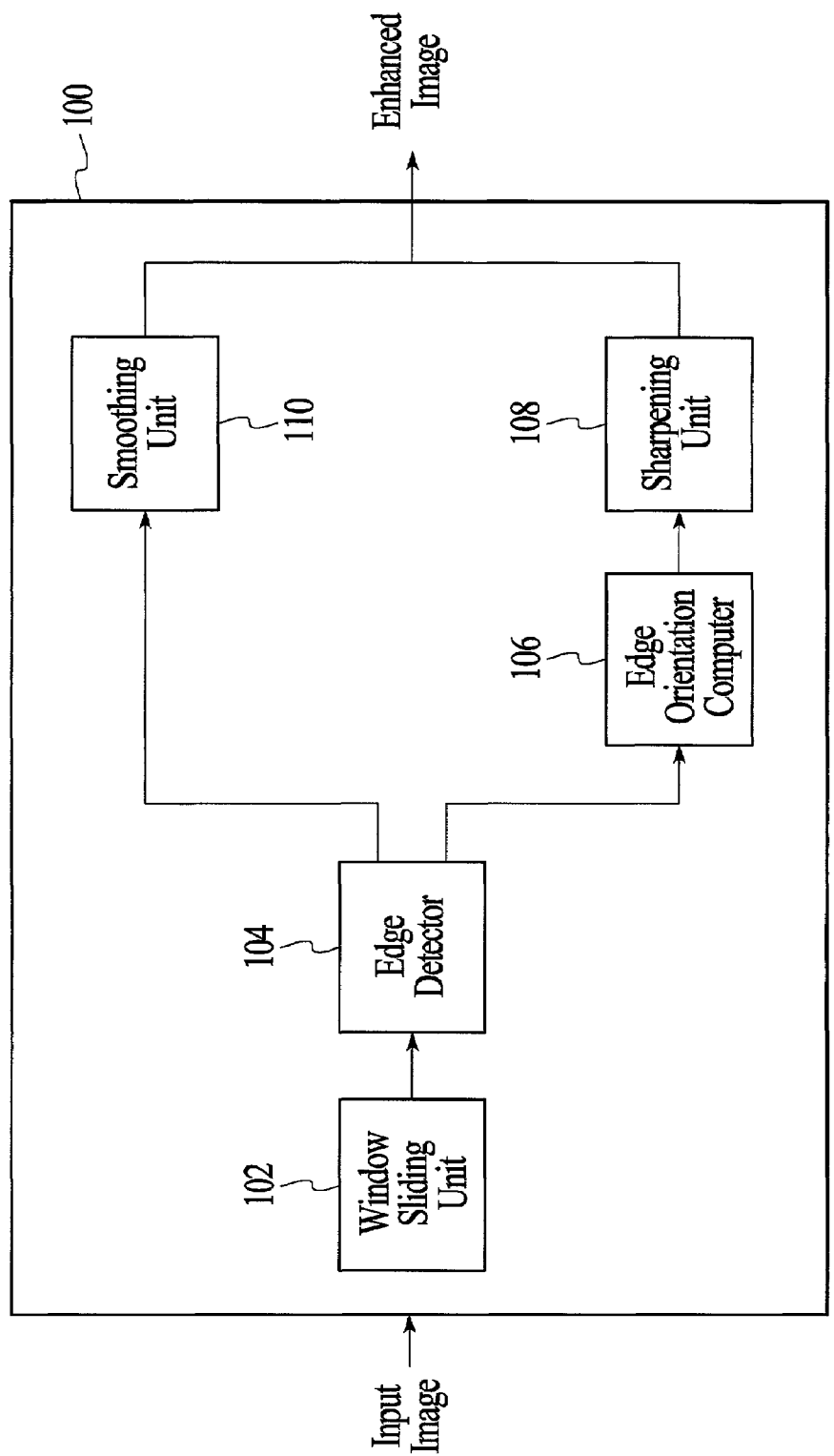
FIG. 1 is a block diagram of an image enhancing system in accordance with the present invention.

With reference to FIG. 1, an image enhancing system 100 in accordance with the present invention is shown. The image enhancing system operates to selectively sharpen or smooth each pixel of an input digital image to enhance the quality of the image. Sharpening of a pixel of the input image is dependent on the direction of a detected edge within an image block about that pixel.

The image enhancing system 100 includes a window sliding unit 102, an edge detector 104, an edge orientation computer 106, a sharpening unit 108 and a smoothing unit 110. Although the components 102–110 of the image enhancing system are illustrated and described as separate units, these components represent functional blocks, and consequently, may or may not be embodied in the form of physically separate units. Thus, two or more of these components may be combined into a single unit. Alternatively, some of these components may be divided into two or more units. Therefore, the image enhancing system may include fewer or more components than described and illustrated. In an exemplary embodiment, the components of the image enhancing system are embodied in an application specific integrated chip (ASIC) as hardware or in a read-only memory (ROM) as firmware. However, these components may be embodied in any combination of hardware, firmware and/or software.

Figures 2, 3:
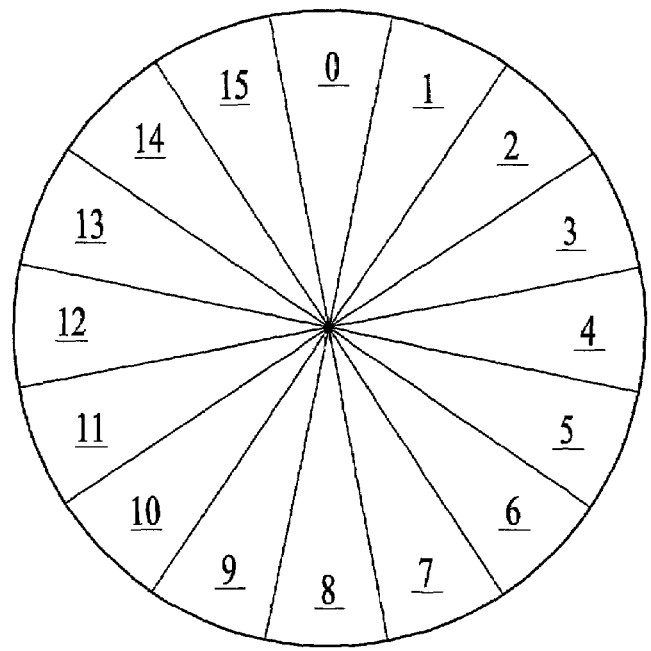
FIG. 2 illustrates an exemplary 5×5 pixel image block of an input image.
FIG. 3 illustrates edge orientation indexes, which are used to classify the direction of a detected edge.

The window sliding unit 102 of the image enhancing system 100 operates to sequentially select image blocks of an input digital image for processing. Each image block corresponds to a pixel of the input digital image, which is situated at the center of that image block. The image blocks are selected by sliding a window of predefined size through every pixel of the input digital image, except for the pixels on the boundary of the input image where the window cannot be positioned within the input image. In an exemplary embodiment, the window sliding unit is configured to select 5×5 pixel image blocks of the input image. In FIG. 2, an exemplary 5×5 pixel image block 200 of an input image is shown. The image block 200 includes 25 pixels, which are referenced as p0 to p24. These references are used herein to identify the pixels in a 5×5 pixel image block. The output of the window sliding unit are the selected image blocks of the input image, which are sequentially transmitted to the edge detector 104.

The edge detector 104 of the image enhancing system 100 operates to determine whether a current image block of an input image contains an edge, which would indicate that the corresponding pixel of the current image block is near the edge. The edge detector may utilize any known edge detection technique to make the determination. In an exemplary embodiment, the edge detector makes the edge determination by analyzing the maximum and minimum values within the current image block.

The operation of the edge detection in accordance with the exemplary embodiment is now described. When a current image block of an input image is received, the maximum and minimum pixel values of the current image bock are determined. Next, the difference between the maximum value and the minimum value is computed. The computed difference is then compared to a threshold, which can be empirically defined. If the computed difference is greater than the threshold, then the pixel of the input image that corresponds to the current image block is considered to be near an edge, and the current image block is transmitted to the edge orientation computer 106 of the system. However, if the computed difference is not greater than the threshold, then the corresponding pixel is not considered to be near an edge, and the current image block is transmitted to the smoothing unit 110.

The edge orientation computer 106 of the image enhancing system 100 operates to determine the orientation of the detected edge within a current image block of an input image. The edge orientation computer uses the horizontal gradient $G_x$ and the vertical gradient $G_y$ of the current image block to determine the direction and the corresponding perpendicular direction of the detected edge. Edge direction is defined as the direction of the steepest slope in a 5×5 pixel image block, from a high value to a low value. The edge orientation computer identifies an edge direction by a pair of orientation indexes, which range from 0 to 15, as illustrated in FIG. 3. The orientation indexes represent sixteen evenly spaced angle regions of a 360-degree circle. Thus, each orientation index includes a 22.5-degree range. The orientation index "0" includes a range from 348.25 degrees to 12.25 degrees. Thus, the rest of the orientation indexes are defined by 22.5-degree increments from the orientation index "0" from either 12.25 or 348.25 degrees. The orientation indexes for the edge direction are referred herein as "shrp_idx1" and "shrp_idx2". Similarly, the edge orientation computer identifies a perpendicular edge direction by a pair of orientation indexes, which are perpendicular to the pair of orientation indexes for the edge direction. For example, if an edge direction is represented the orientation indexes "3" and "11", then the perpendicular edge direction is represented by the orientation indexes "7" and "15". The orientation indexes for the perpendicular edge direction are referred herein as "smth_idx1" and "smth_ind2.

The operation of the edge orientation computer 106 is now described with reference to the process flow diagram of FIGS. 4, 5, 6 and 7. At steps 402 and 404, the horizontal gradient $G_x$ and the vertical gradient $G_y$ of a current image block of an input image are calculated. Steps 402 and 404 can be sequentially performed. Alternatively, steps 402 and 404 can be performed in parallel. The horizontal gradient $G_x$ is computed by using the coefficient matrix 802 shown in FIG. 8 to multiply the pixel values in a current image block with corresponding coefficients in the matrix 802 and then summing the products. The computation of the horizontal gradient $G_x$ can be mathematically expressed as:

$$G_x = -2*p0 - p1 + p3 + 2*p4 - 2*p5 - p6 + p8 + 2*p9 - 2*p10 - p11 + p13 + 2*p14 - 2*p15 - p16 + p18 + 2*p19 - 2*p20 - p21 + p23 + 2*p24.$$

Similarly, the vertical gradient $G_y$ is computed by using the coefficient matrix 902 shown in FIG. 9 to multiply the pixel values in the current image block with corresponding coefficients in the matrix 902 and then summing the products. The computation of the vertical gradient $G_y$ can be mathematically expressed as:

$$G_y = 2*p0 + 2*p1 + 2*p2 + 2*p3 + 2*p4 + p5 + p6 + p7 + p8 + p9 - p15 - p16 - p17 - p18 - p19 - 2*p20 - 2*p21 - 2*p22 - 2*p23 - 2*p24.$$

In computing the horizontal and vertical gradients $G_x$ and $G_y$, the multiplication with coefficients of 2 can be realized by bit shifting. For example, if the pixel value of p0 is "16", then this value is represented as "00010000" in an eight-bit binary format. By shifting the "1" bit one space to the left, the resulting binary number is "00100000", which equals "32" or 2*p0. This technique can also be used for multiplication with coefficients other than 2. For example, by shifting the "1" bit two spaces to the left, the resulting binary number is "01000000", which equals "64" or 4*p0.

Figure 6:
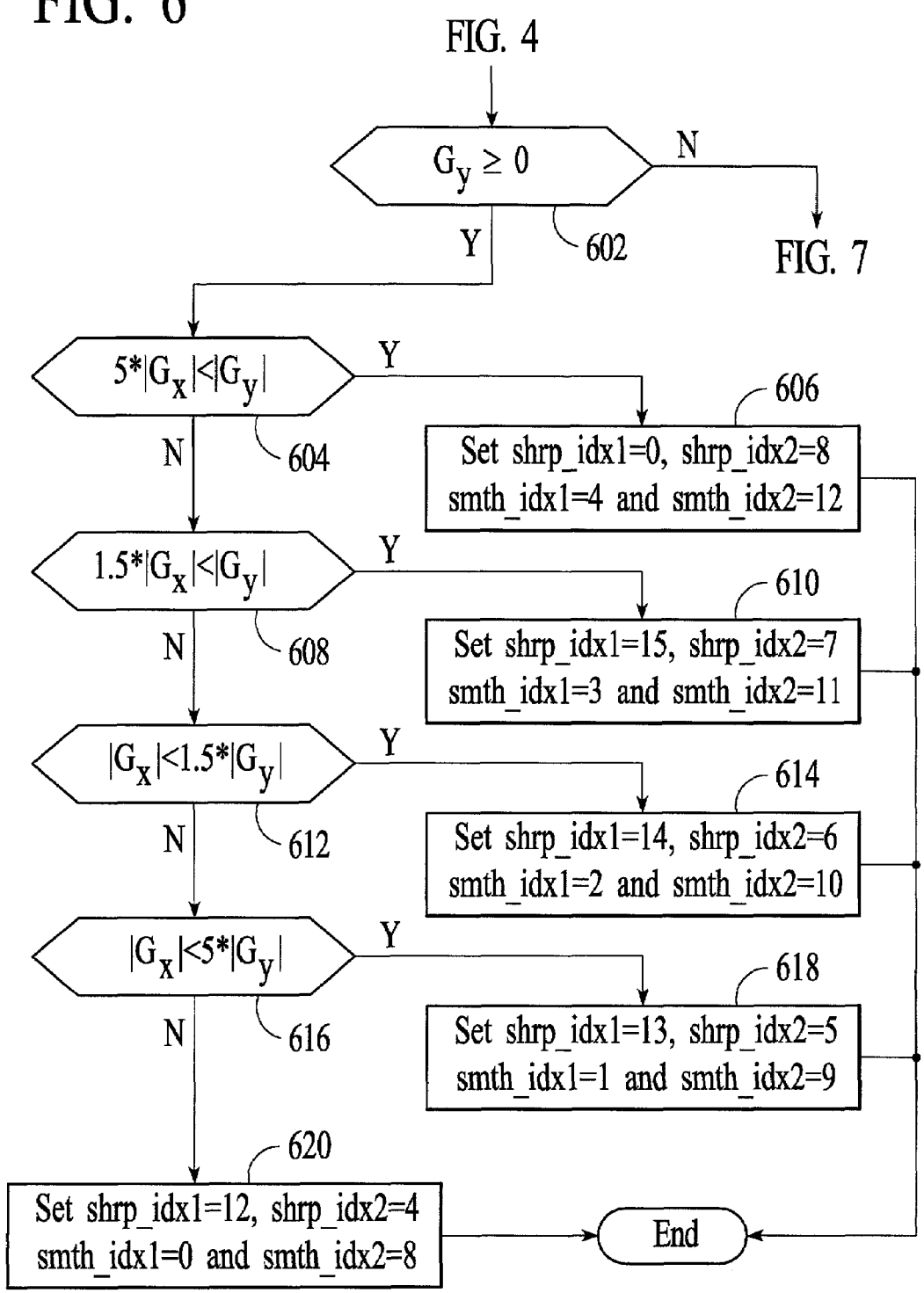

After the horizontal gradient $G_x$ and the vertical gradient $G_y$ are computed, the ratio between $G_x$ and $G_y$ is used to determine the edge direction. In particular, the arctangent of $G_x/G_y$ is used to classify the edge direction to one of the orientation indexes in the following described manner. At step 406, a determination is made whether the computed $G_x$ is equal to or greater than zero. If $G_x$ is less than zero, then the operation proceeds to step 602, which is shown in FIG. 6. However, if $G_x$ is equal to or greater than zero, the operation proceeds to step 408, at which another determination is made whether the computed $G_y$ is equal to or greater than zero.

Figure 5:
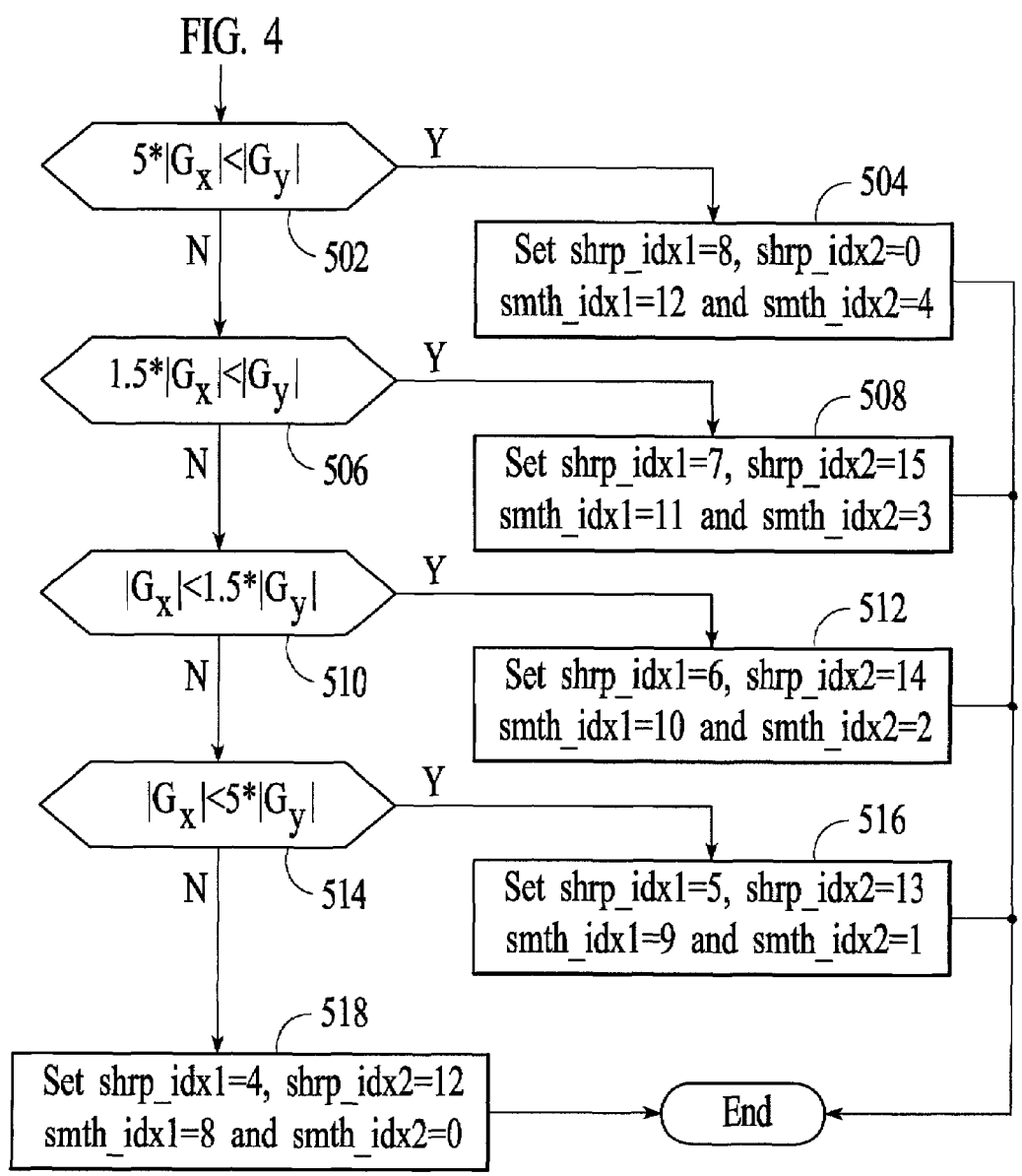

If $G_y$ is less than zero, the operation proceeds to step 502, which is shown in FIG. 5. However, if $G_y$ is equal to or greater than zero, the operation proceeds to step 410, at which a comparison is made between $5*|G_x|$ and $|G_y|$. If $5*|G_x|$ is less than $|G_y|$, the edge direction is determined to fall within the angle region of the orientation index 0. Consequently, at step 412, the shrp_idx1 is set to 0 and the shrp_idx2 is set to 8. In addition, the smth_idx1 is set to 4 and the smth_idx2 is set to 12. However, if $5*|G_x|$ is not less than $|G_y|$, then the operation proceeds to step 414, at which a comparison is made between $1.5*|G_x|$ and $|G_y|$. If $1.5*|G_x|$ is less than $|G_y|$, then the edge direction is determined to fall within the angle region of the orientation index 1. Consequently, at step 416, the shrp_idx1 is set to 1 and the shrp_idx2 is set to 9. In addition, the smth_idx1 is set to 5 and the smth_idx2 is set to 13. However, if $1.5*|G_x|$ is not less than $|G_y|$, then the operation proceeds to step 418, at which a comparison is made between $|G_x|$ and $1.5*|G_y|$. If $|G_x|$ is less than $1.5*|G_y|$, then the edge direction is determined to fall within the angle region of the orientation index 2. Consequently, at step 420, the shrp_idx1 is set to 2 and the shrp_idx2 is set to 10. In addition, the smth_idx1 is set to 6 and the smth_idx2 is set to 14. However, if $|G_x|$ is not less than $1.5*|G_y|$, then the operation proceeds to step 422, at which a comparison is made between $|G_x|$ and $5*|G_y|$. If $|G_x|$ is less than $5*|G_y|$, then the edge direction is determined to fall within the angle region of the orientation index 3. Consequently, at step 424, the shrp_idx1 is set to 3 and the shrp_idx2 is set to 11. In addition, the smth_idx1 is set to 7 and the smth_idx2 is set to 15. However, if $|G_x|$ is not less than $5*|G_y|$, then the operation proceeds to step 426, at which the edge direction is determined to fall within the angle region of the orientation index 4. Consequently, the shrp_idx1 is set to 4 and the shrp_idx2 is set to 12. In addition, the smth_idx1 is set to 8 and the smth_idx2 is set to 0. The operation then comes to an end.

As previously described, if $G_y$ is determined to be less than zero at step 408, then the operation proceeds to step 502 of FIG. 5. At step 502, a comparison is made between $5*|G_x|$ and $|G_y|$. If $5*|G_x|$ is less than $|G_y|$, then the edge direction is determined to fall within the angle region of the orientation index 8. Consequently, at step 504, the shrp_idx1 is set to 8 and the shrp_idx2 is set to 0. In addition, the smth_idx1 is set to 12 and the smth_idx2 is set to 4. However, if $5*|G_x|$ is not less than $|G_y|$, then the operation proceeds to step 506, at which a comparison is made between $1.5*|G_x|$ and $|G_y|$. If $1.5*|G_x|$ is less than $|G_y|$, then the edge direction is determined to fall within the angle region of the orientation index 7. Consequently, at step 508, the shrp_idx1 is set to 7 and the shrp_idx2 is set to 15. In addition, the smth_idx1 is set to 11 and the smth_idx2 is set to 3. However, if $1.5*|G_x|$ is not less than $|G_y|$, then the operation proceeds to step 510, at which a comparison is made between $|G_x|$ and $1.5*|G_y|$. If $|G_x|$ is less than $1.5*|G_y|$, then the edge direction is determined to fall within the angle region of the orientation index 6. Consequently, at step 512, the shrp_idx1 is set to 6 and the shrp_idx2 is set to 14. In addition, the smth_idx1 is set to 10 and the smth_idx2 is set to 2. However, if $|G_x|$ is not less than $1.5*|G_y|$, then the operation proceeds to step 514, at which a comparison is made between $|G_x|$ and $5*|G_y|$. If $|G_x|$ is less than $5*|G_y|$, then the edge direction is determined to fall within the angle region of the orientation index 5. Consequently, at step 516, the shrp_idx1 is set to 5 and the shrp_idx2 is set to 13. In addition, the smth_idx1 is set to 9 and the smth_idx2 is set to 1. However, if $|G_x|$ is not less than $5*|G_y|$, then the operation proceeds to step 518, at which the edge direction is determined to fall within the angle region of the orientation index 4. Consequently, the shrp_idx1 is set to 4 and the shrp_idx2 is set to 12. In addition, the smth_idx1 is set to 8 and the smth_idx2 is set to 0. The operation then comes to an end.

Figure 4:
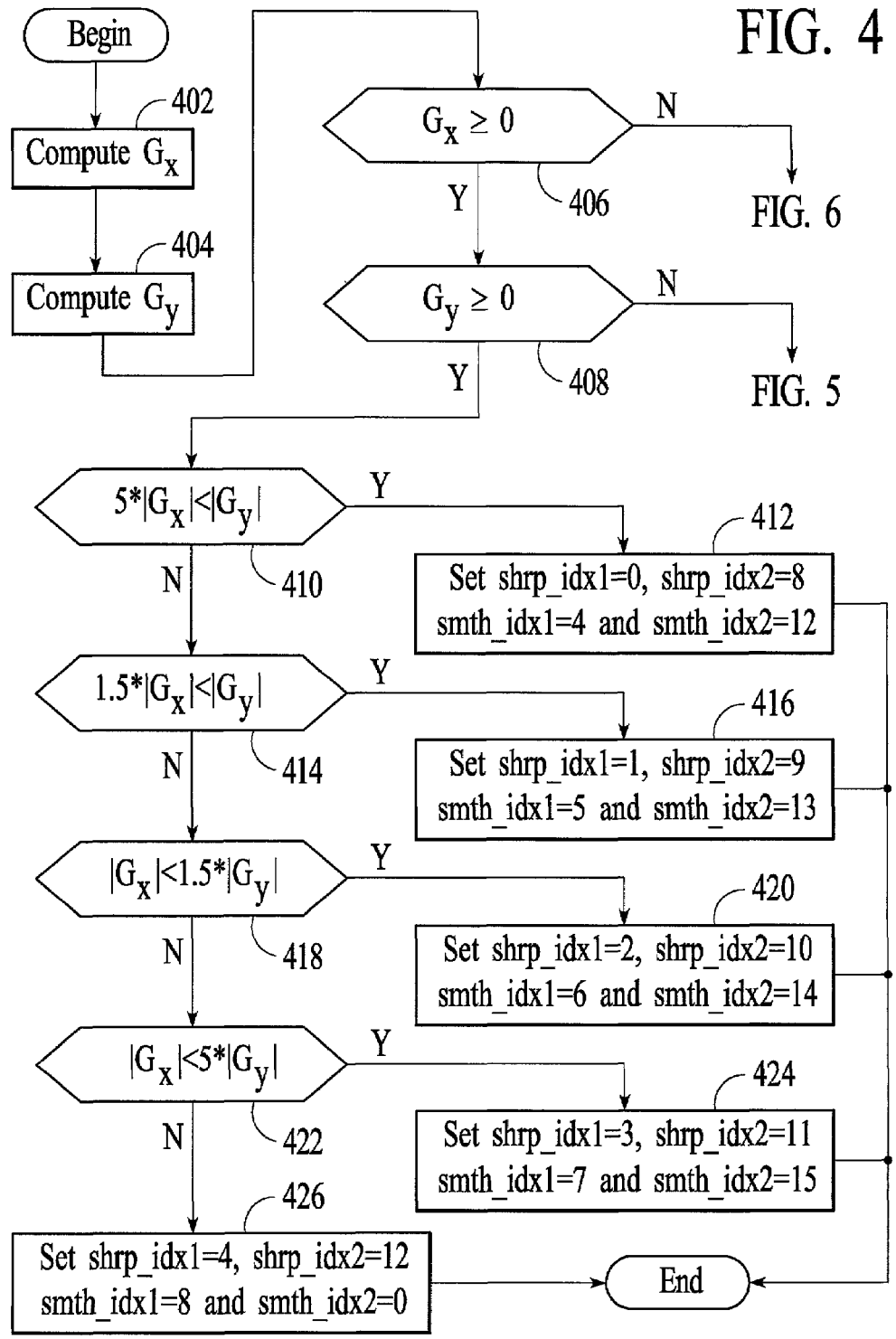
FIGS. 4, 5, 6 and 7 illustrate the operation of an edge orientation computer of the image enhancing system of FIG. 1.
Figure 7:
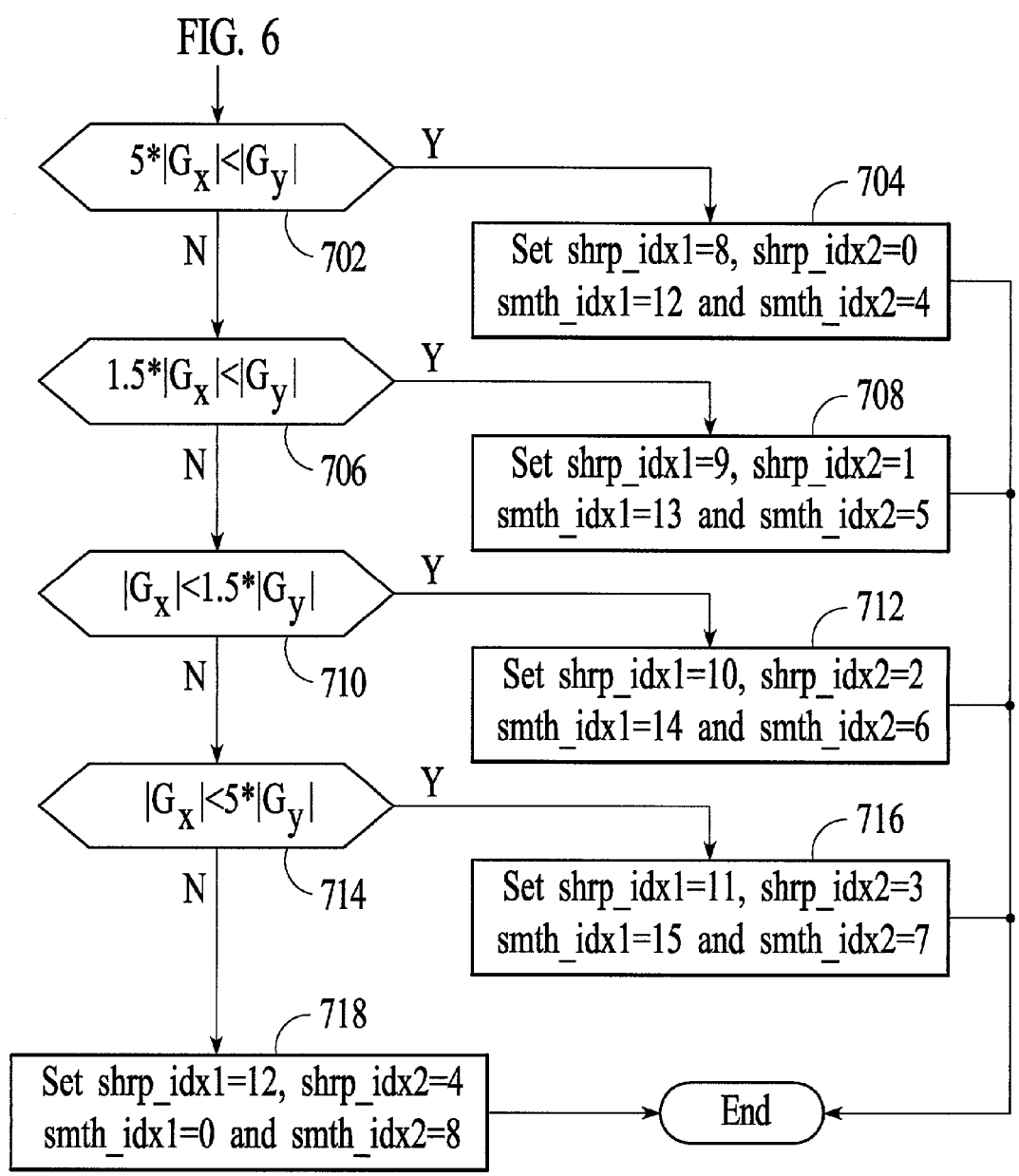

As described above, if $G_x$ is determined to be less than zero at step 406 of FIG. 4, then the operation proceeds to step 602 of FIG. 6. At step 602, a determination is made whether the $G_y$ is equal to or greater than zero. If $G_y$ is less than zero, the operation proceeds to step 702, which is shown in FIG. 7. However, if $G_y$ is equal to or greater than zero, the operation proceeds to step 604, at which a comparison is made between 5*|G$_x$| and |G$_y$|. If 5*|G$_x$| is less than |G$_y$|, the edge direction is determined to fall within the angle region of the orientation index 0. Consequently, at step 606, the shrp_idx1 is set to 0 and the shrp_idx2 is set to 8. In addition, the smth_idx1 is set to 4 and the smth_idx2 is set to 12. However, if 5*|G$_x$| is not less than |G$_y$|, then the operation proceeds to step 608, at which a comparison is made between 1.5*|G$_x$| and |G$_y$|. If 1.5*|G$_x$| is less than |G$_y$|, then the edge direction is determined to fall within the angle region of the orientation index 15. Consequently, at step 610, the shrp_idx1 is set to 15 and the shrp_idx2 is set to 7. In addition, the smth_idx1 is set to 3 and the smth_idx2 is set to 11. However, if 1.5*|G$_x$| is not less than |G$_y$|, then the operation proceeds to step 612, at which a comparison is made between |G$_x$⊕ and 1.5*|G$_y$|. If |G$_x$| is less than 1.5*|G$_y$|, then the edge direction is determined to fall within the angle region of the orientation index 14. Consequently, at step 614, the shrp_idx1 is set to 14 and the shrp_idx2 is set to 6. In addition, the smth_idx1 is set to 2 and the smth_idx2 is set to 10. However, if |G$_x$| is not less than 1.5*|G$_y$|, then the operation proceeds to step 616, at which a comparison is made between |G$_x$| and 5*|G$_y$|. If |G$_x$| is less than 5*|G$_y$|, then the edge direction is determined to fall within the angle region of the orientation index 13. Consequently, at step 618, the shrp_idx1 is set to 13 and the shrp_idx2 is set to 5. In addition, the smth_idx1 is set to 1 and the smth_idx2 is set to 9. However, if |G$_x$| is not less than 5*|G$_y$|, then the operation proceeds to step 620, at which the edge direction is determined to fall within the angle region of the orientation index 12. Consequently, the shrp_idx1 is set to 12 and the shrp_idx2 is set to 4. In addition, the smth_idx1 is set to 0 and the smth_idx2 is set to 8. The operation then comes to an end.

As previously described, if G$_y$ is determined to be less than zero at step 602 of FIG. 6, then the operation proceeds to step 702 of FIG. 7, at which a comparison is made between 5*|G$_x$| and |G$_y$|. If 5*|G$_x$| is less than |G$_y$|, then the edge direction is determined to fall within the angle region of the orientation index 8. Consequently, at step 704, the shrp_idx1 is set to 8 and the shrp_idx2 is set to 0. In addition, the smth_idx1 is set to 12 and the smth_idx2 is set to 4. However, if 5*|G$_x$| is not less than |G$_y$|, then the operation proceeds to step 706, at which a comparison is made between 1.5*|G$_x$| and |G$_y$|. If 1.5*|G$_x$| is less than |G$_y$|, then the edge direction is determined to fall within the angle region of the orientation index 9. Consequently, at step 708, the shrp_idx1 is set to 9 and the shrp_idx2 is set to 1. In addition, the smth_idx1 is set to 13 and the smth_idx2 is set to 5. However, if 1.5*|G$_x$| is not less than |G$_y$|, then the operation proceeds to step 710, at which a comparison is made between |G$_x$| and 1.5*|G$_y$|. If |G$_x$| is less than 1.5*|G$_y$|, then the edge direction is determined to fall within the angle region of the orientation index 10. Consequently, at step 712, the shrp_idx1 is set to 10 and the shrp_idx2 is set to 2. In addition, the smth_idx1 is set to 14 and the smth_idx2 is set to 6. However, if |G$_x$| is not less than 1.5*|G$_y$|, then the operation proceeds to step 714, at which a comparison is made between |G$_x$| and 5*|G$_y$|. If |G$_x$| is less than 5*|G$_y$|, then the edge direction is determined to fall within the angle region of the orientation index 11. Consequently, at step 716, the shrp_idx1 is set to 11 and the shrp_idx2 is set to 3. In addition, the smth_idx1 is set to 15 and the smth_idx2 is set to 7. However, if |G$_x$| is not less than 5*|G$_y$|, then the operation proceeds to step 718, at which the edge direction is determined to fall within the angle region of the orientation index 12. Consequently, the shrp_idx1 is set to 12 and the shrp_idx2 is set to 4. In addition, the smth_idx1 is set to 0 and the smth_idx2 is set to 8. The operation then comes to an end.

The determination of an edge direction can be summarized by the following table.

|  | 5*|G$_x$| < |G$_y$| | 1.5*|G$_x$| < |G$_y$| | |G$_x$| < 1.5*|G$_y$| | |G$_x$| < 5*|G$_y$| | else |
| --- | --- | --- | --- | --- | --- |
| G$_x$ ≧ 0 & G$_y$ ≧ 0 | 0 | 1 | 2 | 3 | 4 |
| G$_x$ ≧ 0 & G$_y$ < 0 | 8 | 7 | 6 | 5 | 4 |
| G$_x$ < 0 & G$_y$ ≧ 0 | 0 | 15 | 14 | 13 | 12 |
| G$_x$ < 0 & G$_y$ < 0 | 8 | 9 | 10 | 11 | 12 |

Similar to the computations of G$_x$ and G$_y$, the comparisons of G$_x$ and G$_y$ can be accomplished by bit shifting. For example, comparing 5*|G$_x$| with |G$_y$| can be achieved by comparing 4*|G$_x$|+|G$_x$| with |G$_y$|, in which the 4*|G$_x$| is realized by bit shifting. As another example, comparing 1.5*|G$_x$| with |G$_y$| can be achieved by comparing 2*|G$_x$|+|G$_x$| with 2|G$_y$|, in which the 2|G$_x$| and 2|G$_y$| are realized by bit shifting.

Turning back to FIG. 1, the sharpening unit 108 of the image enhancing system 100 operates to sharpen the pixel of an input image that corresponds to the current image block being processed. The sharpening is performed by applying smoothing to selected pixels of the current image block along the determined perpendicular edge direction of the current image block to derive a smoothing value and by applying sharpening to selected pixels of the current image block along the direction of the determined edge direction to derive a sharpening value. The smoothing and sharpening values are then averaged to produce the final value for the current pixel of the input image.

The sharpening unit 108 derives the smoothing value by applying the following equation.

$$\text{smoothing value} = (-a0 + 2*a1 + 2*a2 - 58*a6 + 2*a5 + 2a4 - a3)/64.$$

In addition, the sharpening unit derives the sharpening value by applying the following equation.

$$\text{sharpening value} = (b0 + 2*b1 + 2*b2 - 2*b5 - 2*b4 - b3 + 2^{(shrp\_factor)}*b6)/2^{(shrp\_factor)}$$

The variables a0, a1, a2, a3, a4, a5 and a6 in the smoothing value equation represent the selected pixels of the current image block to which the smoothing is applied. Similarly, the variables b0, b1, b2, b3, b4, b5 and b6 in the sharpening value equation represent the selected pixels of the current image block to which the sharpening is applied. The selected pixels represented by the variables a0, a1, a2, a3, a4, a5 and a6 depend on the two orientation indexes for the perpendicular edge direction. The selected pixels represented by the variables b0, b1, b2, b3, b4, b5 and b6 depend on the two orientation indexes for the edge direction. Thus, these variables change as the orientation indexes for the edge direction and the perpendicular edge direction are varied. The relationships between these variables and the orientation indexes are illustrated in the following table.

| shrp_idx1, shrp_idx2 smth_idx1, smth_idx2 | a0/b0 | a1/b1 | a2/b2 | a3/b3 | a4/b4 | a5/b5 | a6/b6 |
|---|---|---|---|---|---|---|---|
| 0, 8 | p2 | p7 | p7 | p22 | p17 | p17 | p12 |
| 1, 9 | p3 | p8 | p7 | p21 | p16 | p17 | p12 |
| 2, 10 | p4 | p8 | p8 | p20 | p16 | p16 | p12 |
| 3, 11 | p9 | p8 | p13 | p15 | p16 | p11 | p12 |
| 4, 12 | p14 | p13 | p13 | p10 | p11 | p11 | p12 |
| 5, 13 | p19 | p18 | p13 | p5 | p6 | p11 | p12 |
| 6, 14 | p24 | p18 | p18 | p0 | p6 | p6 | p12 |
| 7, 15 | p23 | p18 | p17 | p1 | p6 | p7 | p12 |
| 8, 0 | p22 | p17 | p17 | p2 | p7 | p7 | p12 |
| 9, 1 | p21 | p16 | p17 | p3 | p8 | p7 | p12 |
| 10, 2 | p20 | p16 | p16 | p4 | p8 | p8 | p12 |
| 11, 3 | p15 | p16 | p11 | p9 | p8 | p13 | p12 |
| 12, 4 | p10 | p11 | p11 | p14 | p13 | p13 | p12 |
| 13, 5 | p5 | p6 | p11 | p19 | p18 | p13 | p12 |
| 14, 6 | p0 | p6 | p6 | p24 | p18 | p18 | p12 |
| 15, 7 | p1 | p6 | p7 | p23 | p18 | p17 | p12 |

Using the above table, if the orientation indexes for the edge direction, i.e., shrp_idx1 and shrp_idx2, are 3 and 11, respectively, then a0=p9, a1=p8, a2=p13, a3=p15, a4=p16, a5=p11 and a6=p12. Likewise, if the orientation indexes for the perpendicular edge direction, smth_idx1 and smth_idx2, are 3 and 11, then b0=p9, b1=p8, b2=p13, b3=p15, b4=p16, b5=p11 and b6=p12. The multiplications and divisions in these equations can again be realized by bit shifting.

The shrp_factor term in the sharpening value equation determines the amount of sharpening performed by the sharpening unit 108 of the image enhancing system 100. The shrp_factor term ranges from 1 to 5, depending on the amount of sharpening desired. The strongest level for the sharpening is when the shrp_factor is set to 1.

The smoothing unit 110 of the image enhancing system 100 operates to smooth the pixel of an input image that corresponds to the current image block. The smoothing unit performs the smoothing operation using the same smoothing equation used by the sharpening unit 108 for two pre-selected perpendicular directions. For example, two perpendicular directions represented by the orientation indexes 3 and 11, and the orientation indexes 7 and 15 may be used as the pre-selected directions. Using the pre-selected directions, two smoothing values are computed and then averaged by the smoothing unit. The output of the smoothing unit is the averaged value of the two computed smoothing values.

Figure 10:
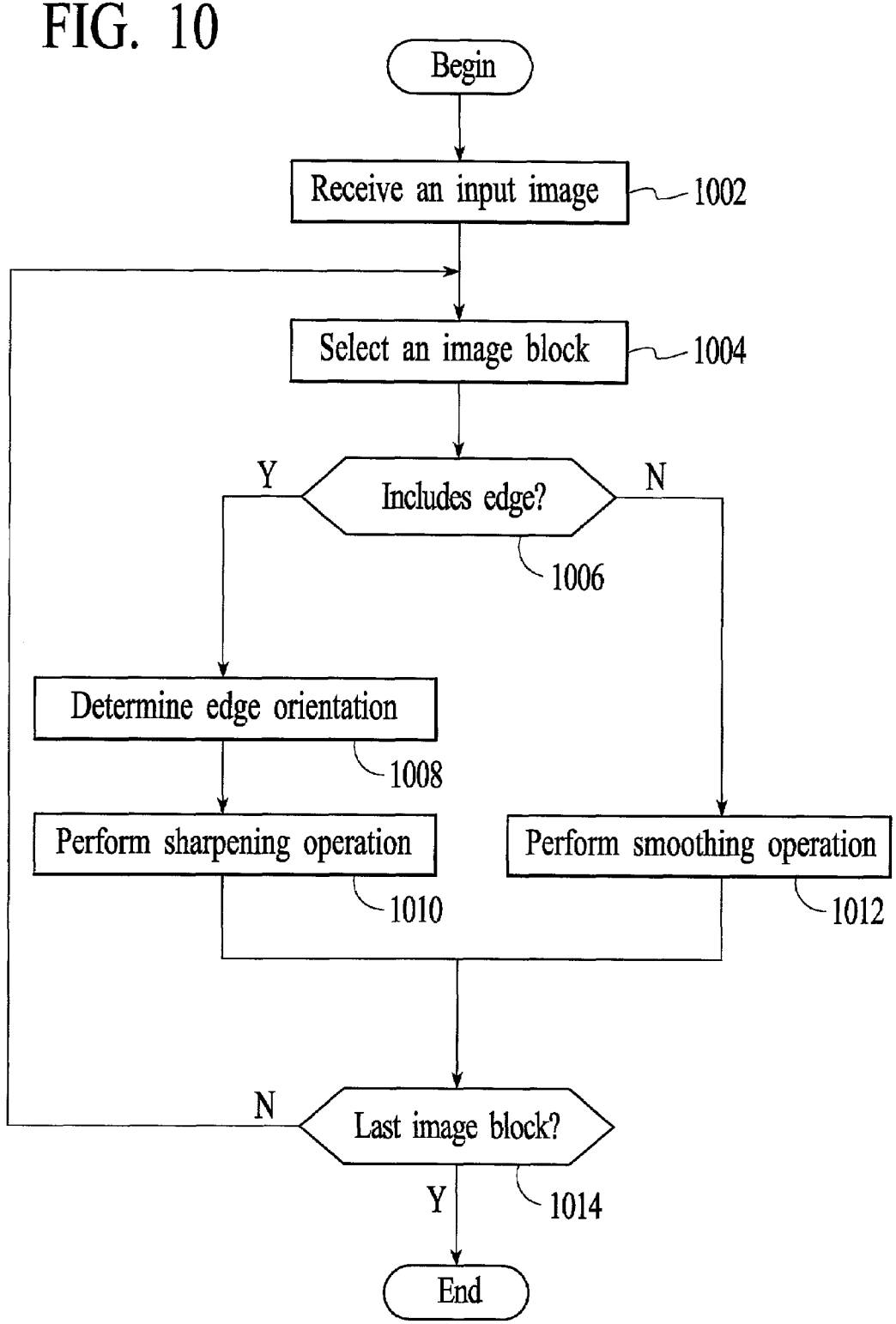
FIG. 10 is a process flow diagram of a method for enhancing an input image in accordance with the present invention

A method of enhancing an input image in accordance with the present invention is now described with reference to the flow diagram of FIG. 10. At step 1002, the input image is received. Next, at step 1004, an image block of the input image is selected to be processed. In the exemplary embodiment, the image block is a 5×5 pixel block. Next, at step 1006, a determination is made whether the image block includes an edge. If the current image block includes an edge, the method proceeds to step 1008, at which the edge orientation is determined. The edge orientation determination includes determining the direction of the edge and the corresponding perpendicular direction. Next, at step 1010, a sharpening operation is performed on the current image block using the determined edge orientation to derive a final pixel value for the pixel that corresponds to the current image block.

Returning to step 1006, if the current image block is determined not to include an edge, the method proceeds to step 1012, at which a smoothing operation is performed on the current image block using two pre-selected perpendicular directions to derive a different final pixel value.

Next, at step 1014, a determination is made whether the current image block is the last image block of the input image to be processed. If the current image block is not the last image block, the method proceeds back to step 1004, at which the next image block to be processed is selected. The steps 1006–1014 are then repeated for this next image block. However, if the current image block is the last image block, the method comes to an end.

In the above-described system and method, the edge detection and the edge orientation determination are conducted on the luminance channel of the $Yc_rc_b$ color space. If the original image is an RGB image, then the luminance is derived from the red (R), green (G) and blue (B) channels using one of various combinations of R, G and B values. As an example, the following equation can be used to derive the luminance:

$$\text{luminance}=(2*R+5*G+B)/8.$$

In contrast, the smoothing and sharpening operations are performed on each color channel of the RGB color space. Thus, the color space of the input image is converted from the $Yc_rc_b$ color space to the RGB color space. However, the smoothing and sharpening operations may alternatively be conducted on the luminance channel. In this case, there is no need to convert the image from the $Yc_rc_b$ color space to the RGB color space. In either case, if the input image is originally in the RGB color space, then the input image is initially converted to the $Yc_rc_b$ color space.

Although a specific embodiment of the invention have been described and illustrated, the invention is not to be limited to the specific forms or arrangements of parts so described and illustrated. The scope of the invention is to be defined by the claims appended hereto and their equivalents.

What is claimed is:

1. A method of processing an input image comprising:
    detecting an edge within an image block of said input image, said image block corresponding to a pixel of said input image;
    determining a direction of said edge within said image block, including utilizing a ratio of a horizontal gradient value and a vertical gradient value of said image block to determine said direction of said edge, wherein said utilizing of said ratio of said horizontal gradient value and said vertical gradient value includes comparing a multiple of said horizontal gradient value with a multiple of said vertical gradient value to determine said direction of said edge; and
    sharpening said pixel of said input image according to said direction of said edge within said image block.

2. The method of claim 1 wherein said utilizing of said ratio of said horizontal gradient value and said vertical gradient value includes computing said horizontal gradient value and said vertical gradient value of said image block using bit shifting.

3. The method of claim 1 further comprising computing said multiple of said horizontal gradient value and said multiple of said vertical gradient value using bit shifting.

4. The method of claim 1 wherein said detecting of said edge within said image block of said input image includes comparing the difference between the maximum pixel value and the minimum pixel value of said image block with a predefined threshold.

5. The method of claim 1 wherein said sharpening of said pixel of said input image includes applying sharpening to selected pixel values of said image block along said direction of said edge to produce an enhanced pixel of said pixel of said input image.

6. The method of claim 5 wherein said sharpening of said pixel of said input image includes applying smoothing to selected pixel values of said image block along a perpendicular direction of said direction of said edge to produce said enhanced pixel of said pixel of said input image.

7. The method of claim 1 further comprising smoothing said pixel of said input image when said edge is not detected in said image block of said input image, including applying smoothing to selected pixel values of said image block along two pre-selected perpendicular directions to produce a smoothed pixel of said pixel of said input image.

8. A system for processing an input image comprising:
an edge detector that is configured to detect an edge within an image block of said input image, said image block corresponding to a pixel of said input image;
an edge orientation computer operatively coupled to said edge detector, said edge orientation computer being configured to determine a direction of said edge within said image block, said edge orientation computer being configured to utilize a ratio of a horizontal gradient value and a vertical gradient value of said image block to determine said direction of said edge, said edge orientation computer being configured to compare a multiple of said horizontal gradient value with a multiple of said vertical gradient value to determine said direction of said edge; and
a sharpening unit operatively coupled to said edge orientation computer, said sharpening unit being configured to enhance said pixel of said input image according to said direction of said edge in said image block determined by said edge orientation computer.

9. The system of 8 wherein said edge orientation computer is configured to compute said horizontal gradient value and said vertical gradient value of said image block using bit shifting.

10. The system of 8 wherein said edge orientation computer is configured to compute said multiple of said horizontal gradient value and said multiple of said vertical gradient value using bit shifting.

11. The system of claim 8 wherein said sharpening unit is configured to apply sharpening to selected pixel values of said image block along said direction of said edge to produce an enhanced pixel of said pixel of said input image.

12. The system of claim 11 wherein said sharpening unit is configured to apply smoothing to selected pixel values of said image block along a perpendicular direction of said direction of said edge to produce said enhanced pixel of said pixel of said input image.

13. The system of claim 8 further comprising a smoothing unit operatively coupled to said edge detector, said smoothing unit being configured to smooth said pixel of said input image when said edge is not detected in said image block of said input image by said edge detector, said smoothing unit being configured to apply smoothing to selected pixel values of said image block along two pre-selected perpendicular directions to produce a smoothed pixel of said pixel of said input image.

14. A program storage medium readable by a computer, tangibly embodying a computer program of instructions executable by said computer to perform method steps for enhancing an input image, said method steps comprising:
detecting an edge within an image block of said input image, said image block corresponding to a pixel of said input image;
determining a direction of said edge within said image block, including utilizing a ratio of a horizontal gradient value and a vertical gradient value of said image block to determine said direction of said edge and comparing a multiple of said horizontal gradient value with a multiple of said vertical gradient value to determine said direction of said edge; and
sharpening said pixel of said input image according to said direction of said edge within said image block.

15. The program storage medium of claim 14 wherein method step of sharpening said pixel of said input image includes applying sharpening to selected pixel values of said image block along said direction of said edge to produce an enhanced pixel of said pixel of said input image.

16. The program storage medium of claim 15 wherein method step of sharpening said pixel of said input image includes applying smoothing to selected pixel values of said image block along a perpendicular direction of said direction of said edge to produce said enhanced pixel of said pixel of said input image.

17. The program storage medium of claim 14 wherein said method steps further comprise smoothing said pixel of said input image when said edge is not detected in said image block of said input image, including applying smoothing to selected pixel values of said image block along two pre-selected perpendicular directions to produce a smoothed pixel of said pixel of said input image.

18. The program storage medium of claim 14 wherein said method step of determining said direction of said edge within said image block includes computing said horizontal gradient value and said vertical gradient value of said image block using bit shifting.

* * * * *